United States Patent
Gu et al.

[11] Patent Number: 5,838,215
[45] Date of Patent: Nov. 17, 1998

[54] RF CHOKE WITH A LOW Q CORE FORMED BY SINTERING FERROUS AND FERRIC OXIDES

[75] Inventors: Wang-Chang Albert Gu; E. S. Ramakrishnan, both of Coral Springs, Fla.; Robert A. Burr, Albuquerque; Adam D. Moya, Peralta, both of N. Mex.

[73] Assignee: Motorola, Inc., Schaumburg, Ill.

[21] Appl. No.: 598,830

[22] Filed: Feb. 5, 1996

[51] Int. Cl.⁶ .................................................. H01F 27/24
[52] U.S. Cl. ........................ 333/181; 252/62.56; 336/233
[58] Field of Search .................... 333/181, 182, 333/183, 184, 185, 172; 252/62.56; 336/233

[56] References Cited

U.S. PATENT DOCUMENTS

| | | | |
|---|---|---|---|
| 2,561,495 | 7/1951 | Harvey | 336/233 X |
| 2,766,211 | 10/1956 | Miller | 252/62.56 X |
| 3,055,832 | 9/1962 | Weisz | 252/62.56 X |
| 3,638,147 | 1/1972 | Denes | 333/182 |
| 3,781,740 | 12/1973 | Kirmis et al. | 336/233 X |
| 3,982,814 | 9/1976 | Kaiserwerth et al. | 333/185 |

OTHER PUBLICATIONS

Krauss et al., *Solid State Radio Engineering*, 1980, pp. 3,103,126, and 221.

*Primary Examiner*—Robert Pascal
*Assistant Examiner*—Justin P. Bettendorf
*Attorney, Agent, or Firm*—Barbara R. Doutre

[57] ABSTRACT

A radio frequency (RF) choke inductor (102, 500, 600) includes a magnetic core (502, 602) which substantially dissipates RF and microwave signals. The magnetic core (502, 602) is sufficiently lossy to provide a substantially resistive impedance at RF and microwave frequencies. The magnetic core is formed by providing a homogeneous ferrite composition characterized by a mixture of ferrous ions and ferric ions (404), and then sintering the homogeneous ferrite composition in an inert gas atmosphere (412) to provide a rapid electron exchange reaction. A conductive wire is then wound about the magnetic core (414) to complete the choke inductor.

10 Claims, 5 Drawing Sheets

RF CHOKE WITH A LOW Q CORE FORMED BY SINTERING FERROUS AND FERRIC OXIDES

TECHNICAL FIELD

This invention relates in general to inductors and more specifically to inductors used as radio frequency (RF) chokes.

BACKGROUND

Isolation between electrical circuits is an important design consideration for all radio frequency (RF) circuit designers. RF choke inductors are commonly employed in electronic circuits to prevent RF signals from coupling back to other critical electrical circuits. For example, RF chokes are often used on direct current (DC) supply lines to block RF signals leaking from RF power amplifiers. The blocking effect of today's RF choke inductors is achieved by reflecting the leaking RF signal back to its source. To achieve the required high impedance for blocking the RF signal, designers are usually forced to resort to RF chokes having a large inductive reactance with high quality factor (Q). A disadvantage associated with these RF choke inductors is that they are inherently large and bulky and hence take up precious circuit board space. Furthermore, high inductance, high Q inductors tend to be costly. It would be advantageous to have an RF choke inductor of reduced size and cost that could still meet the protection needs of the circuitry within which it is being used.

Accordingly, there is a need for an improved RF choke inductor that can meet RF design goals while still addressing the issues of size and cost. An RF choke inductor that is capable of providing protection even into the microwave frequency range would be a further benefit.

DETAILED DESCRIPTION OF THE PREFERRED EMBODIMENT

Figure 1:
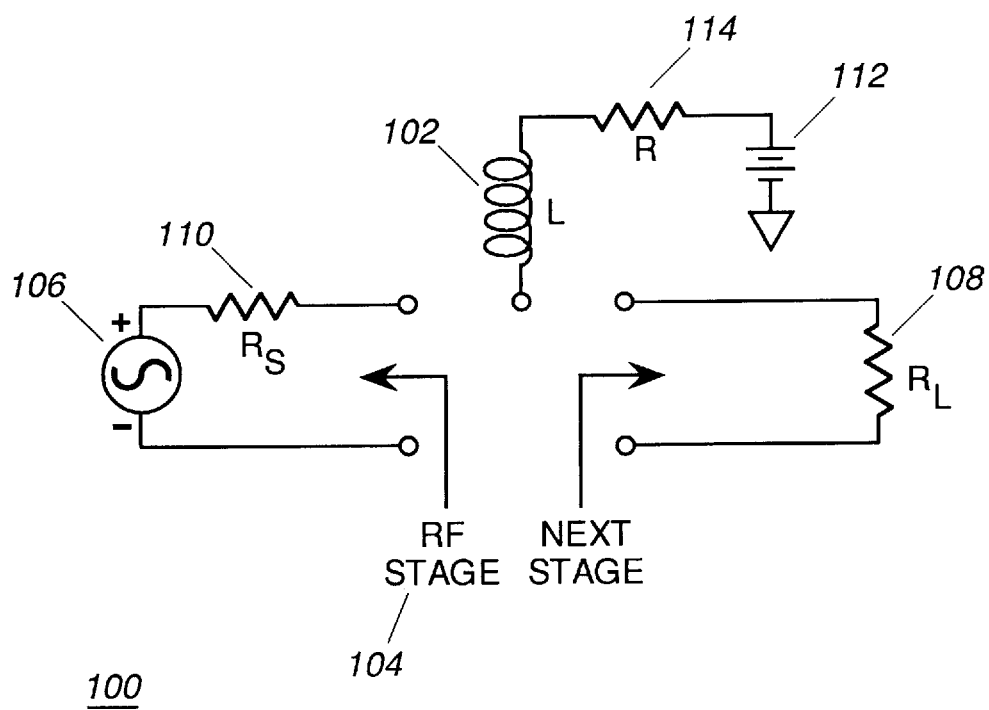
FIG. 1 is simplified circuit diagram implementing an RF choke inductor in accordance with the present invention.

While the specification concludes with claims defining the features of the invention that are regarded as novel, it is believed that the invention will be better understood from a consideration of the following description in conjunction with the drawing figures, in which like reference numerals are carried forward.

In general when designing RF chokes the goal is to achieve a high impedance device using a high frequency magnetic material. Prior art RF choke inductors use a large inductive reactance to achieve the high impedance for blocking an RF signal. These prior art chokes operate by reflecting a large percentage of the RF signal back to the RF source from whence it originated. In accordance with the present invention, an RF choke inductor, to be described herein, uses a unique approach whereby a very lossy magnetic core is developed to produce a high resistive impedance achieved with a relatively low inductance value. In accordance with the present invention, this choke operates by substantially dissipating RF energy as heat through its magnetic core as opposed to reflecting it.

Referring now to FIG. 1, there is shown an RF choke inductor 102, formed in accordance with the present invention, being applied in a simplified circuit diagram 100, preferably a portion of a communication device, such as a two-way radio. A radio frequency (RF) stage 104, such as an amplifier stage, generates RF signals from an RF source 106 for reception by a load, $R_L$, 108, such as an antenna or a second amplifier stage. RF source 106 is shown with a characteristic series resistance, $R_s$, 110. A direct current (DC) power supply section 112 supplies the RF stage 104 through RF choke 102. RF choke 102 is characterized with an inherent series resistance, R, 114.

In accordance with the present invention, RF choke 102 provides a magnetic core for substantially dissipating leakage RF signals not received by the load 108. In the past, RF chokes were used to protect DC supplies by using an inductor having a very large inductance value behaving as a very high reactive impedance. The RF choke 102 of the present invention, however, uses a resistive impedance achieved through a high loss magnetic material. Since the magnetic material is high loss at high frequencies (RF frequencies and greater), the DC losses of the choke 102 are not impacted. Hence, RF choke 102 also has an advantage in that it allows DC current to pass through it with minimal loss.

The RF choke inductor 102 shown in FIG. 1 can be analyzed as a two port network. The fractional power that is delivered to the load, $R_L$, also referred to as transducer power gain, can be expressed in terms of scattering parameter $S_{21}$ as:

$$|S_{21}|^2 = \frac{4 R_S}{R_L \left[ \left( 1 + \frac{R_S}{R_L} + \frac{R_S R}{R^2 + \omega^2 L^2} \right)^2 + \left( \frac{R_S \omega L}{R^2 + \omega^2 L^2} \right)^2 \right]}$$

where $R_s$ represents the series resistance of the RF source 106, $R_L$ represents the impedance of the load, R represents the series resistance of the RF choke 102, $\omega$ represents the angular frequency, and L represents the inductance of the choke 102.

The quality factor (Q) of the RF choke inductor 102 is defined as, $$Q = \frac{\omega L}{R}$$

For a fixed transducer power gain and a matched load, $R_S = R_L$, the required inductance can be determined through:

$$\omega L = \frac{\frac{R_S}{Q} + \left[\left(\frac{R_S}{Q}\right)^2 + R_S^2 \left(\frac{1}{|S_{21}|^2} - 1\right)\left(1 + \frac{1}{Q^2}\right)\right]^{1/2}}{2\left(\frac{1}{|S_{21}|^2} - 1\right)\left(1 + \frac{1}{Q^2}\right)}$$

Figure 2:
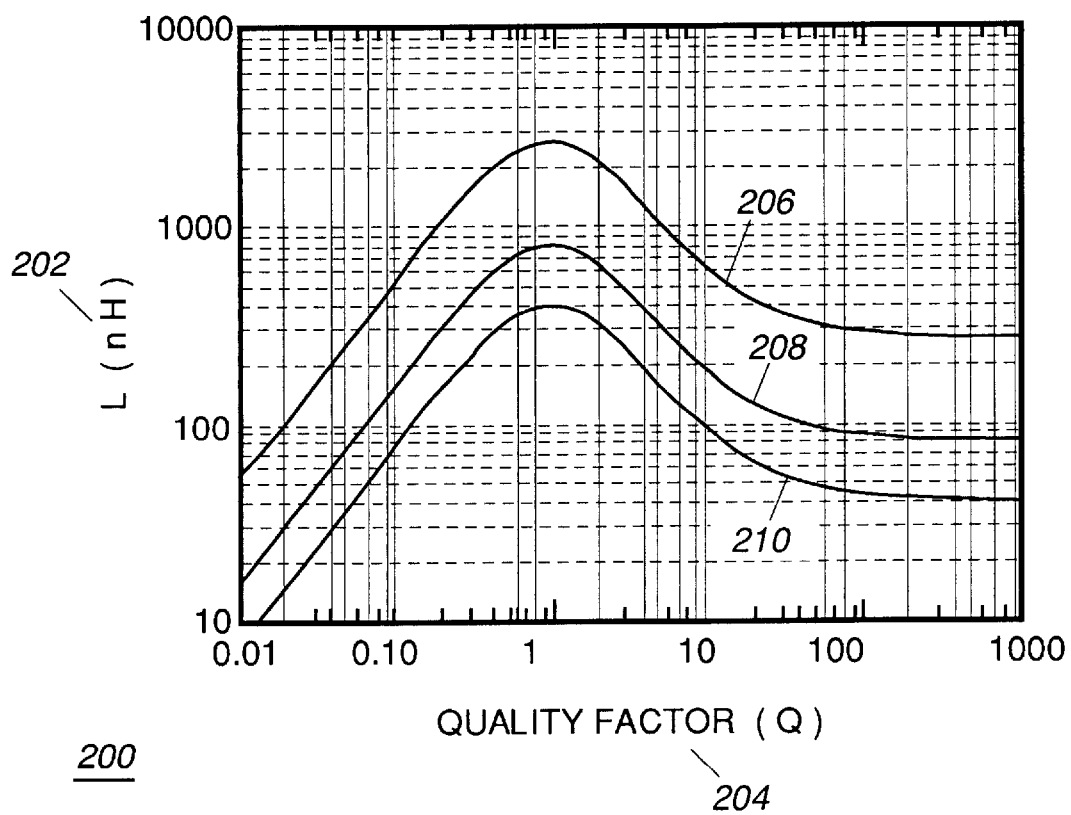
FIG. 2 is a graph representing simulated data of inductance versus quality factor required for delivering 99% of available RF power to the load shown in FIG. 1.

Referring now to FIG. 2, there is shown a graph 200 representing simulated data of the required inductance versus quality factor for delivering 99% of available RF power to the load, $R_L$, shown in FIG. 1. Inductance 202 is measured in nanoHenries (nH) versus quality factor (Q) 204. Graph 200 depicts three separate curves at three different RF operating frequencies. Curve 206 is simulated at a frequency 150 megahertz (MHz), curve 208 is simulated at 500 MHz, and curve 210 is simulated at 1.0 gigahertz (GHz). From the graph 200, it can be seen that, for an inductor Q above 1, higher inductance is needed as the Q decreases. Chokes in this range tend to be large and bulky. To overcome these difficulties, it can be seen from the graph 200 that the required inductance for the RF choke can be reduced considerably when the RF choke 102 inductor is extremely lossy. From the simulated data of graph 200, for an inductor having a Q of less than 0.1, the inductance value decreases sharply. Hence, inductors formed in this range are smaller and less bulky than those formed in the region above the inductor Q of 1. In accordance with the present invention, a high RF impedance is accomplished with an inductor having an extremely lossy magnetic core. The lossy magnetic core provides a high resistive impedance at RF frequencies, thus reducing the required inductive reactance. In accordance with the present invention, the high resistive impedance of the magnetic core is used to dissipate RF energy as opposed to the prior art method of reflecting the energy back to the source.

Additionally, since the DC resistance of the inductor 102 is completely determined by the conductor winding, the presence of a lossy magnetic core essentially has no influence on its DC resistance. In fact, because of the reduced inductance requirement of the choke inductor 102 described by the invention, its conductor length in terms of the number of windings is reduced, and hence, the DC resistance is reduced accordingly.

The remaining 1% of available RF power not delivered to the load, $R_L$, can be partitioned into reflected power and dissipated power. The reflected power is expressed in terms of the scattering parameter $S_{11}$ as:

$$|S_{11}|^2 = \frac{[a - R_s(a^2 + b^2)]^2 + b^2}{[a + R_s(a^2 + b^2)]^2 + b^2}$$

where a and b are respectively defined as:

$$a = \frac{1}{R_L} + \frac{R}{R^2 + \omega^2 L^2}$$

and $$b = -\frac{\omega L}{R^2 + \omega^2 L^2}$$

Figure 3:
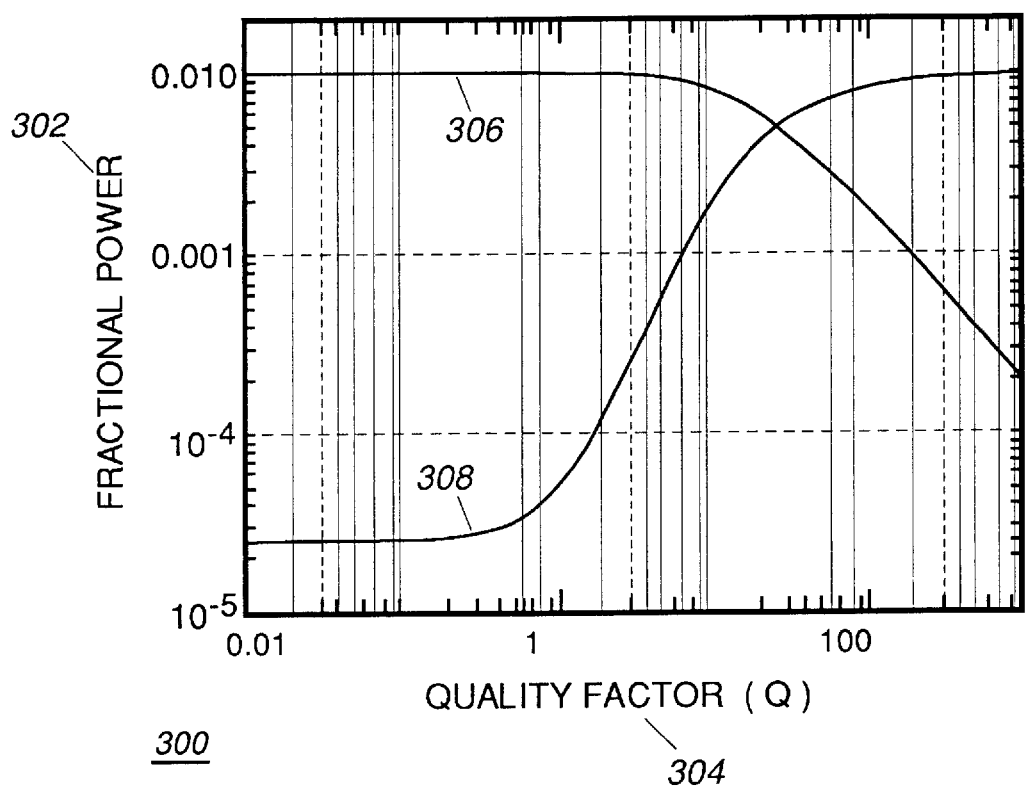
FIG. 3 is a graph representing simulated data of fractional power (dissipated and reflected) as a function of inductor quality factor (Q) for the remaining 1% RF power leakage not delivered to the load shown in FIG. 1.

This remaining 1% of the available RF power is graphically represented in FIG. 3 of the accompanying drawings. For simplicity, only fractional power at one frequency (1 GHz) has been shown. Graph 300 represents simulated data of the fractional power 302 as a function of inductor quality factor (Q) 304 at the frequency of 1 GHz. Graph 300 illustrates dissipated power by curve 306 and reflected power by curve 308. As the value of Q decreases (in this case below a value of approximately 1) a substantial portion of the RF power is dissipated in the high loss core. As a result, the return loss ($S_{11}$) of the RF choke inductor 102, formed of a lossy magnetic core in accordance with the present invention, is desirably higher than that of the conventional approach. A magnetic core which is sufficiently lossy to provide a substantially resistive impedance at RF frequencies will dissipate RF power in accordance with the present invention.

Prior art approaches use a large inductive reactance to achieve the required high impedance for blocking an RF signal, while the RF choke inductor 102 of the present invention uses a very lossy magnetic core providing a high resistive impedance with relatively low inductance values. Hence, smaller value inductors requiring fewer windings can be used resulting in a smaller component. Fewer windings about the core also provides the further advantage of a reduced DC resistance across the component.

In the conventional approach to magnetic cores, the focus has been on reducing magnetic loss for high frequency applications. The conventional approach has required the sintering of ferrites under very precise process conditions to control chemical composition and phases, where a single phase composition is often required. As yet a low loss magnetic material for applications above frequencies of 1 GHz is not yet conventionally available. The high loss magnetic core of the RF choke inductor of the present invention and its formation to be described herein provides for inductors which can operate as RF chokes even in the microwave frequency range.

Figure 4:
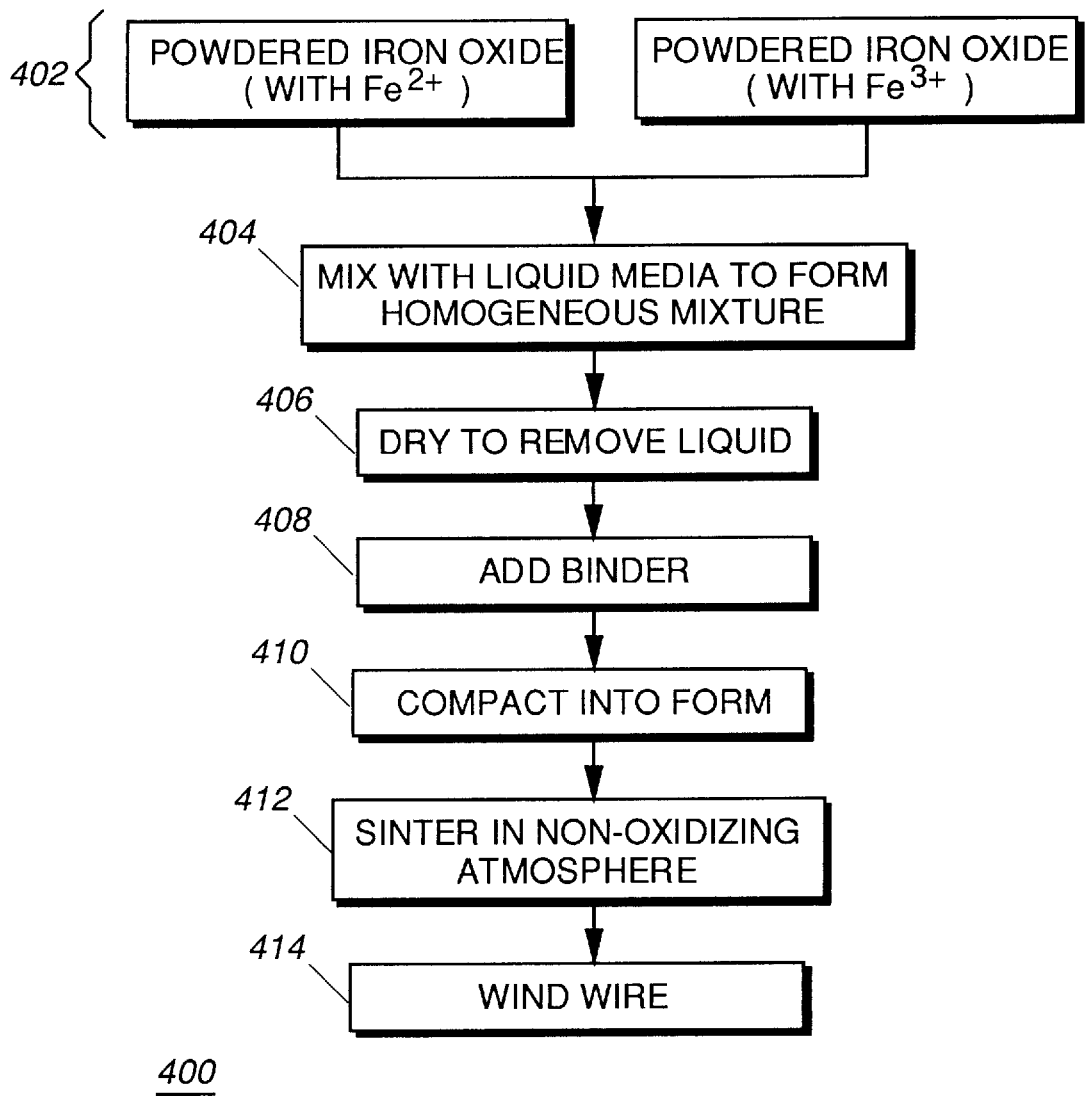
FIG. 4 is a flowchart 400 of the process used in achieving a high loss magnetic core for an RF choke inductor in accordance with the present invention.

In accordance with the present invention, a controlled process is used in the formation of the lossy magnetic core for the RF choke inductor 102. At RF and microwave frequencies, it is generally believed that magnetic loss can be attributed to the reversible exchange reaction between metallic ions at different valence states. Ferrites formed of ferrous valence state ($Fe^{2+}$) ions and ferrites formed of ferric valence state ($Fe^{3+}$) ions can be combined to promote electronic conductivity which leads to loss. In accordance with the present invention, the process involves controlling material composition of ferric and ferrous ions. Referring now to FIG. 4, there is shown a flowchart 400 which represents the process used in achieving a high loss magnetic core for an RF choke inductor in accordance with the present invention. Step 402 provides at least two powdered ion oxides, one being characterized by a ferrous valence state ($Fe^{2+}$) and the other being characterized by a ferric valence state ($Fe^{3+}$). The two compounds are mixed into a liquid media to form a homogeneous mixture at step 404. The homogeneous mixture is then dried at a temperature sufficient to remove, or evaporate, the liquid media at step 406 to provide a dried homogeneous mixture. Binder is then added using well known techniques at step 408 to keep the powders together. Step 410 compacts the dried homogeneous mixture into a form, such as a toroidal or cylindrical shape. The form is then sintered in a non-oxidizing atmosphere at step 412, such as nitrogen, sufficient to convert a portion of the $Fe^{3+}$ to $Fe^{2+}$. By sintering the form in a non-oxidizing atmosphere, the $Fe^{2+}$ content is increased to a concentration sufficient to provide a rapid electron exchange reaction in the final composition to increase the loss of the magnetic core. Thus, the high loss magnetic core is achieved.

A wire can then be wrapped about the magnetic core formed in accordance with the steps of flowchart 400 to form the completed RF choke at step 414. The lossy magnetic core, in accordance with the present invention, isolates RF energy from electronic circuits, such as power supplies, by providing a resistive impedance at RF frequencies.

Iron tends to be used in two chemical states. $Fe^{+2}$ and $Fe^{+3}$. In the conventional approach to forming RF chokes, the goal has been to achieve a very low loss magnetic core material using iron in the $Fe^{+3}$ state. The RF choke described by the present invention, however, does not require the large inductance, because the magnetic core is very lossy at high frequency. This lossy core provides a resistive impedance to accomplish the choke function. The actual inductance can thus be a smaller value which allows for a smaller physical part. By increasing the concentration of iron in the $Fe^{+2}$ state in the final composition, the RF choke of the present invention achieves a very high loss composition.

As an example, consider mixing 50% by weight each of powdered $Fe_2O_3$ (ferric oxide) and powdered $Fe_3O_4$ (ferrous-ferric oxide) into a liquid media, such as water or alcohol, for approximately 6–12 hours to form a homogeneous mixture. Dry the homogeneous mixture at approximately 100° Celsius to remove the liquid to form a dried homogenous mixture of the two powders. Next, mix the dried homogeneous powders together, preferably using well known binder techniques which are typically of an organic medium, such as polyvinyl alcohol, and then dry again. A hydraulic press, or similar mechanism known in the art, is now used to create the desired form, such as cylindrical disc, torroid, or other shape. Sinter the form in a furnace using an inert gas, such as nitrogen, using a temperature range of approximately 1000°–1300° C. to allow for the conversion of ferric ions to ferrous ions to form a mixed ionic compound. A magnetic core is thus created that provides a resistive impedance at RF and microwave frequencies.

Referring to the table below, there is shown a sample of measured data based on magnetic cores formed from the combination of the $Fe_2O_3$ and $Fe_3O_4$ mixture sintered in nitrogen described above. The data compares the magnetic Q at two different frequencies, 500 MHz and 1 GHz, for mixtures sintered nitrogen and one set of data points showing the mixture sintered in air.

| Sintering Temperature | FREQUENCY | |
| --- | --- | --- |
| (°C.) | 500MHz | 1 GHz |
| 1100 | 1.5 | 0.6 |
| 1200 | 0.2 | 0.3 |
| 1200 | 0.5 | 0.2 |
| 1200 | 0.8 | 0.2 |
| 1200 | 0.7 | 0.2 |
| 1250 | 1.0 | 0.8 |
| 1200 (air) | 90 | 94 |

As can be seen from the table, the magnetic Q of the core sintered in nitrogen is significantly lower than the magnetic Q of the core sintered in air. By controlling the firing with a non-oxidizing atmosphere, a low value Q can now be achieved. Other non-oxidizing atmospheres such as argon, argon-hydrogen mixture or pure hydrogen can also be used during the sintering to achieve similar results. Again, the goal of the process is to increase the proportion of ferrous ions to a sufficient concentration to provide for a rapid electron exchange reaction which increases the losses of the core in the final composition. Other oxides of iron such as FeO (ferrous oxide) $Fe_3O_4$ (ferrousferric oxide), and $NiFe_2O_4$ (nickel ferrite) can also be used to create the lossy magnetic core for the RF choke inductor of the present invention. For example, FeO can be combined with either $Fe_3O_4$ or $NiFe_2O_4$, and $NiFe_2O_4$ can be combined with $Fe_3O_4$. Hence, there has been provided a lossy magnetic core at high frequencies which, when used in an RF choke, provides a high resistive impedance to an RF signal.

Figure 5:
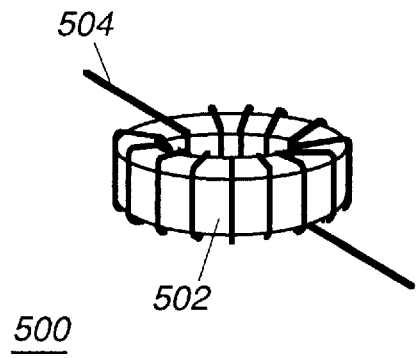
FIG. 5 is a choke inductor formed in accordance with the present invention.

FIG. 5 of the accompanying drawings shows a choke inductor 500 formed in accordance with the present invention. Magnetic core 502, formed in accordance with the technique described by the present invention, provides a lossy torroidal shape core having a sufficiently high resistive impedance to dissipate RF energy. A conductive wire 504 forms windings distributed about the magnetic core 502.

Figure 6:
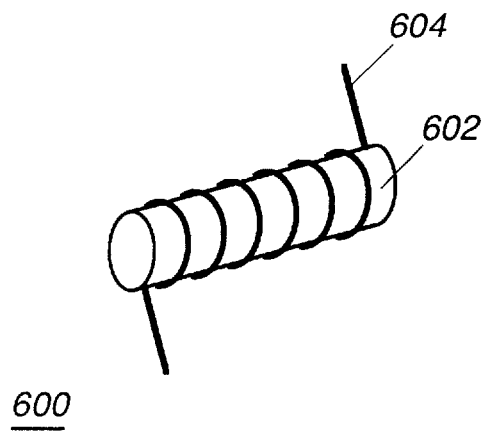
FIG. 6 is another choke inductor formed in accordance with the present invention.

FIG. 6 shows another RF choke inductor 600 formed in accordance with the present invention. Magnetic core 602, also formed in accordance with the technique described by the present invention, provides a lossy cylindrical shape core having a sufficiently high resistive impedance to dissipate RF energy. A conductive wire 604 forms windings distributed about the magnetic core 602.

Accordingly, there has been provided an RF choke inductor and method of forming same that provides a resistive impedance at RF and microwave frequencies to dissipate RF signals. The RF choke inductor described by the invention uses a high loss core which is inexpensive to manufacture as compared to prior art low loss cores. The result is a smaller value inductance being able to operate as an RF choke to protect critical circuits from RF leakage signals. The smaller value inductance allows for a smaller component which takes up less space on a circuit board. Another benefit associated with the RF choke inductor described by the invention is that fewer windings are required about the core which leads to a decrease in the series DC resistance value associated with the component. A lower DC resistance value provides for a smaller voltage drop across the component in circuit applications.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A radio frequency (RF) choke, comprising:
   a magnetic core having a quality factor (Q) less than 1 formed by:
   mixing at least two powdered iron oxide compounds, at least one compound being characterized by a ferrous valence state ($Fe^{2+}$) and at least one compound being characterized by a ferric valence state ($Fe^{3+}$), into a liquid media to form a homogeneous mixture;
   drying the homogeneous mixture at a temperature sufficient to remove the liquid media;
   compacting the dried homogeneous mixture into a form; and
   sintering the form in a non-oxidizing atmosphere sufficient to convert a portion of the $Fe^{3+}$ to $Fe^{2+}$;
   a wire wrapped about said magnetic core; and
   the magnetic core providing a
   substantially resistive impedance at RF frequencies.

2. An RF choke as described in claim 1, wherein the at least two powdered iron oxide compounds includes $Fe_3O_4$ and FeO.

3. An RF choke as described in claim 1, wherein the at least two powdered iron oxide compounds includes $NiFe_2O_4$ and $Fe_3O_4$.

4. An RF choke as described in claim 1, wherein the at least two powdered iron oxide compounds includes $NiFe_2O_4$ and FeO.

5. An RF choke as described in claim 1, wherein the liquid media comprises alcohol or water.

6. An RF choke as described in claim 1, wherein the step of mixing comprises mixing 50% by weight $Fe_2O_3$ and 50% by weight $Fe_3O_4$.

7. An RF choke as described in claim 6, wherein the step of sintering takes place over a temperature range of approximately 1000–1300 degrees Celsius.

8. A radio frequency (RF) choke, comprising:

a magnetic core having a quality factor (Q) less than 1 formed by:
providing a homogeneous ferrite composition characterized by a mixture of ferrous ions and ferric ions; and
sintering the homogeneous ferrite composition in an inert gas atmosphere sufficient to convert a portion of the ferric ions to ferrous ions;
a conductive wire wrapped about said magnetic core; and
said magnetic core providing a substantially resistive impedance at RF frequencies.

9. A radio frequency choke as described in claim 8, wherein the sintering provides for a rapid electron exchange reaction.

10. A radio frequency (RF) choke, comprising:

a magnetic core having a quality factor (Q) less than 1 formed by:
mixing at least two powdered iron oxide compounds into a liquid media to form a homogeneous mixture, said at least two powdered iron oxide compounds including at least one compound being characterized by a ferric valence state ($Fe^{3+}$);
drying the homogeneous mixture at a temperature sufficient to remove the liquid media;
compacting the dried homogeneous mixture into a shape; and
sintering the shape in a non-oxidizing atmosphere sufficient to convert a portion of the $Fe^{3+}$ to a ferrous valence state ($Fe2^+$);
a conductive wire wrapped about said magnetic core; and
said magnetic core providing a substantially resistive impedance at RF frequencies.

\* \* \* \* \*